United States Patent
Park et al.

(10) Patent No.: US 12,066,151 B2
(45) Date of Patent: Aug. 20, 2024

(54) SOLID HYDROGEN STORAGE SYSTEM

(71) Applicants: Hyundai Motor Company, Seoul (KR); Kia Corporation, Seoul (KR)

(72) Inventors: Ji Hye Park, Gwanak-gu (KR); Ji Sung Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 565 days.

(21) Appl. No.: 17/412,740

(22) Filed: Aug. 26, 2021

(65) Prior Publication Data

US 2022/0299166 A1 Sep. 22, 2022

(30) Foreign Application Priority Data

Mar. 17, 2021 (KR) .......... 10-2021-0034684

(51) Int. Cl.
*F17C 11/00* (2006.01)
*C01B 3/00* (2006.01)
*F25B 15/00* (2006.01)

(52) U.S. Cl.
CPC .......... *F17C 11/005* (2013.01); *C01B 3/0036* (2013.01); *C01B 3/0057* (2013.01); *C01B 3/0068* (2013.01); *C01B 3/0078* (2013.01); *F25B 15/00* (2013.01); *F17C 2221/012* (2013.01); *F17C 2225/0138* (2013.01)

(58) Field of Classification Search
CPC .............. F17C 11/005; F17C 2221/012; F17C 2225/0138; C01B 3/0036; C01B 3/0057; C01B 3/0068; C01B 3/0078; F25B 15/00
See application file for complete search history.

(56) References Cited

U.S. PATENT DOCUMENTS

| 5,393,616 | A | 2/1995 | Mori et al. |
| 5,565,079 | A | 10/1996 | Griego |
| 2014/0126680 | A1* | 5/2014 | Nee .......... B22F 9/08 75/235 |
| 2021/0180752 | A1 | 6/2021 | Lee et al. |

FOREIGN PATENT DOCUMENTS

| CN | 112993324 A | | 6/2021 |
| CN | 114604822 A | * | 6/2022 |
| DK | 201500118 A1 | * | 3/2015 |
| KR | 10-2020-0145878 A | | 12/2020 |
| KR | 10-2021-0045683 A | | 4/2021 |
| KR | 10-2021-0074895 A | | 6/2021 |
| KR | 10-2021-0077397 A | | 6/2021 |

OTHER PUBLICATIONS

Machine Translation of CN-114604822-A (Apr. 30, 2024) (Year: 2024).*

* cited by examiner

*Primary Examiner* — Matthew J Merkling
(74) *Attorney, Agent, or Firm* — Morgan, Lewis & Bockius LLP

(57) ABSTRACT

A storage system for storing solid hydrogen includes: a plurality of storages including two or more types of solid hydrogen storage materials having different magnetic intensities; a storage container configured to accommodate the storages; and a coil disposed inside the storage container and configured to apply a variable magnetic field to the storages accommodated in the storage container.

15 Claims, 2 Drawing Sheets

SOLID HYDROGEN STORAGE SYSTEM

CROSS REFERENCE TO RELATED APPLICATION

The present application claims the benefit of priority to Korean Patent Application No. 10-2021-0034684, filed Mar. 17, 2021, the entire contents of which is incorporated herein for all purposes by this reference.

TECHNICAL FIELD

The present disclosure relates to a technology in relation to a system capable of storing hydrogen using a solid hydrogen storage material.

BACKGROUND

In general, technologies of storing hydrogen are classified into a high-pressure gas storage technology, a low-temperature liquid storage technology, and a solid hydrogen storage technology. Among these technologies, the solid hydrogen storage technology refers to a technology for physically storing hydrogen in a porous solid material or chemically storing hydrogen by means of interatomic bonding between a solid substance and hydrogen. Because the solid hydrogen storage technology may store hydrogen at or near a normal pressure, the solid hydrogen storage technology is more advantageous in safety than the high-pressure gas storage technology. Because the solid hydrogen storage technology may store hydrogen at or near a room temperature, it is not necessary to maintain an extremely low temperature unlike the low-temperature liquid storage technology.

Among these technologies, the technology for chemically storing hydrogen by means of interatomic bonding between hydrogen and a solid substance implements a larger storage capacity per unit volume, and thus implements high spatial utilization. Examples of the solid hydrogen storage materials, on which studies are being currently and actively conducted, include AB, AB2, AB5, BCC-based hydrogen storage alloys and alanate, amide-based complex metal hydrides.

An exothermic reaction, which generates reaction heat, occurs when the solid hydrogen storage material adsorbs hydrogen, and an endothermic reaction, which absorbs heats from the surroundings, occurs when hydrogen is discharged.

Therefore, an appropriate cooling process is required when hydrogen is adsorbed to the solid hydrogen storage material, and an appropriate heating process is required when hydrogen is discharged.

To this end, a heating device and a cooling device are provided in a solid hydrogen storage system in the related art.

The foregoing explained as the background of the invention is intended merely to aid in the understanding of the background of the present disclosure, and is not intended to mean that the present disclosure falls within the purview of the related art that is already known to those skilled in the art.

SUMMARY

The present disclosure has been made in an effort to provide a solid hydrogen storage system capable of uniformly controlling a temperature of a solid hydrogen storage material and thus simplifying the system without requiring a separate heat exchange structure for transferring heat to the solid hydrogen storage material, the solid hydrogen storage system being capable of increasing a hydrogen storage capacity of the solid hydrogen storage material without requiring a separate additive for increasing thermal conductivity of the solid hydrogen storage material.

In one aspect, the present disclosure provides a storage system for storing solid hydrogen including: a plurality of storages including two or more types of solid hydrogen storage materials having different magnetic intensities; a storage container configured to accommodate the storages; and a coil disposed in the storage container and configured to apply a variable magnetic field to the storages accommodated in the storage container.

The storages may include: first storages including the solid hydrogen storage materials including ferromagnetic elements; and second storages including the solid hydrogen storage materials which are not ferromagnetic, including paramagnetic and non-magnetic solid hydrogen storage materials.

The first storages may include the solid hydrogen storage materials having a smaller hydrogen storage capacity and a lower hydrogen discharge temperature than the solid hydrogen storage materials of the second storages.

The ferromagnetic element included in the first storage may be made of at least one of Fe, Ni, or Co.

The first storage may include a hydrogen storage alloy made of one or both of $LaNi_5$ and TiFe.

The second storages may include the solid hydrogen storage materials having a higher hydrogen discharge temperature than the solid hydrogen storage materials of the first storages.

The second storages may include the solid hydrogen storage materials made of one or more of metal hydrides such as $MgH_2$ and complex metal hydrides made of alanate, amide-based materials such as $NaAlH_4$.

A mixing ratio of the first storages and the second storages may be set such that the first storages account for 10% or more and less than 90% of the whole.

The solid hydrogen storage system may further include a cooling tube in which a refrigerant flows to cool the storages accommodated in the storage container.

The storage container may include: an inner casing configured to accommodate the storages; and an outer casing configured to surround the inner casing, and the coil may be disposed between the inner casing and the outer casing.

A cooling tube in which a refrigerant flows may be installed between the inner casing and the outer casing to cool the storages accommodated in the inner casing.

A cooling tube in which a refrigerant flows may be installed to pass through the inside of the inner casing to cool the storages accommodated in the inner casing.

The present disclosure provides the solid hydrogen storage system capable of uniformly controlling a temperature of the solid hydrogen storage material and thus simplifying the system without requiring a separate heat exchange structure for transferring heat to the solid hydrogen storage material, and the solid hydrogen storage system may increase a hydrogen storage capacity of the solid hydrogen storage material without requiring a separate additive for increasing thermal conductivity of the solid hydrogen storage material.

In addition, according to the solid hydrogen storage system according to the present disclosure, the storages accommodated in the storage container may be heated in a contactless manner by applying the magnetic field to the storages. As a result, a degree of design freedom in relation to the shape and the magnitude of the system is high, the capacity of the system is large, and the system may be applied to various application fields.

DETAILED DESCRIPTION

Figure 1:
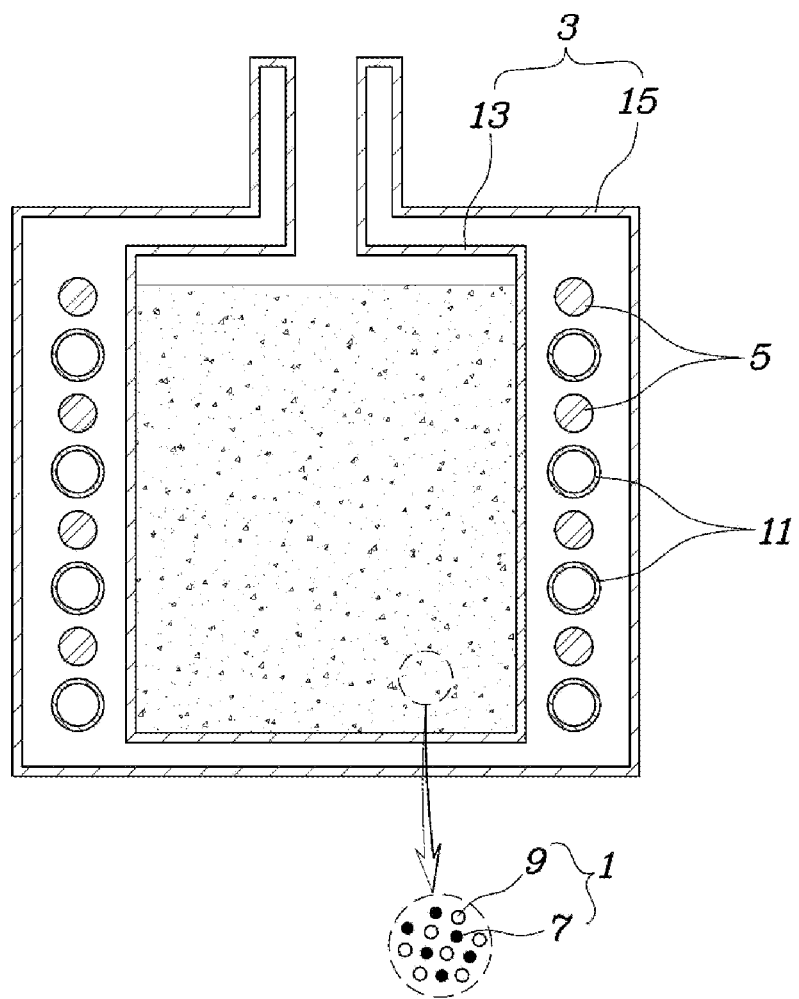
FIG. 1 is a view illustrating an embodiment of a solid hydrogen storage system according to the present disclosure.

Specific structural or functional descriptions of exemplary embodiments of the present disclosure disclosed in this specification or application are exemplified only for the purpose of explaining the exemplary embodiments according to the present disclosure, the exemplary embodiments according to the present disclosure may be carried out in various forms, and it should not be interpreted that the present disclosure is limited to the exemplary embodiments described in this specification or application.

Because the exemplary embodiments according to the present disclosure may be variously changed and may have various forms, specific exemplary embodiments will be illustrated in the drawings and described in detail in the present specification or application. However, the descriptions of the specific exemplary embodiments are not intended to limit exemplary embodiments according to the concept of the present disclosure to the specific exemplary embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context. In the present specification, it should be understood that the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, an exemplary embodiment of the present disclosure will be described in detail with reference to the accompanying drawings. Like reference numerals indicated in the respective drawings refer to like members.

Figure 2:
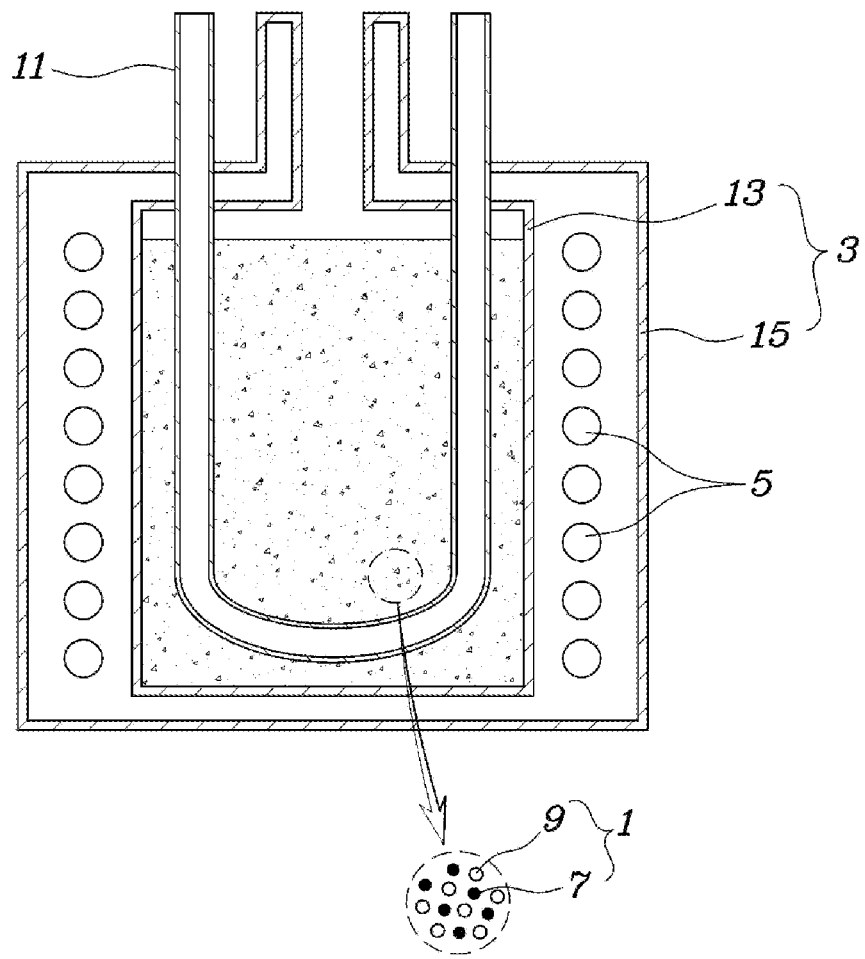
FIG. 2 is a view illustrating another embodiment of the solid hydrogen storage system according to the present disclosure.

Referring to FIGS. 1 and 2, embodiments of solid hydrogen storage systems according to the present disclosure each includes, in common: a plurality of storages 1 having two or more types of solid hydrogen storage materials having different magnetic intensities; a storage container 3 configured to accommodate the storages 1; and a coil 5 provided to apply a variable magnetic field to the storages 1 accommodated in the storage container 3.

That is, according to the present disclosure, the two or more types of storages 1 having different magnetic intensities are accommodated in a storage space, and the storages 1 store hydrogen. In order to discharge the hydrogen, the variable magnetic field is applied to the storages 1 through the coil 5, such that the adsorbed hydrogen may be easily and smoothly discharged by induction heating occurring in the storages 1.

In the present embodiments, the storages 1 include first storages 7 including solid hydrogen storage materials including ferromagnetic elements, and second storages 9 including non-ferromagnetic solid hydrogen storage materials.

That is, the second storage 9 may be paramagnetic or non-magnetic.

When the variable magnetic field is applied to the storages 1, the first storages 7 including the ferromagnetic elements implement induction heating that autonomously generates heat by means of a magnetic hysteresis loss and an eddy current loss.

In a case in which the second storages 9 is made of paramagnetic or non-magnetic materials, induction heating is generated by the magnetic hysteresis loss and the eddy current loss even though this induction heating is not as much as the induction heating generated by the first storages 7. Even in the case of the non-magnetic material, the induction heating is generated by the eddy current loss.

Therefore, when the variable magnetic field is applied to the coil 5 in the state in which the paramagnetic or non-magnetic second storages 9 and the first storages 7, which include the ferromagnetic elements and are relatively more ferromagnetic than the second storages 9, are mixed and accommodated in the storage container 3, a temperature of the first storages 7 is increased by induction heating, the first storages 7 discharge hydrogen, magnetism of the first storages 7 from which hydrogen is discharged is further increased by dehydrogenation, the induction heating is further increased, and the second storages 9 are heated by the generated heat, thereby assisting the second storages 9 in discharging hydrogen.

In the present embodiments, the first storages 7 may include the solid hydrogen storage materials having a smaller hydrogen storage capacity and a lower hydrogen discharge temperature than the solid hydrogen storage materials of the second storages 9. The second storages 9 may include the solid hydrogen storage materials having a higher hydrogen discharge temperature than the solid hydrogen storage materials of the first storages 7.

In this case, as described above, when the variable magnetic field is applied to the contents stored in the storage container 3 through the coil 5, the first storages 7 having a relatively low hydrogen discharge temperature and including the ferromagnetic elements and thus having ferromagnetism are heated first, thereby discharging hydrogen. The first storages 7 from which hydrogen is discharged have further intense magnetism, and a larger magnetic hysteresis loss occurs in accordance with the intense magnetism, such that a larger amount of heat is generated, and the second storages 9 mixed together, having a relatively high hydrogen discharge temperature, and a large hydrogen storage capacity are heated, thereby discharging hydrogen adsorbed to the second storages 9.

In this case, when the hydrogen discharge temperature of the first storages 7 is adjusted to or near a room temperature, hydrogen substantially adsorbed to the first storages 7 and the second storages 9 may be discharged by inputting minimum energy.

The ferromagnetic element included in the first storage 7 may be made of at least one of Fe, Ni, or Co. For example, the first storage 7 may include AB, $AB_2$, and $AB_5$-type hydrogen storage alloy.

For reference, TiFe is included in the AB-type hydrogen storage alloy, $TiMn_2$ is included in the $AB_2$-type hydrogen storage alloy, and $LaNi_5$ is included in the $AB_5$-type hydrogen storage alloy.

The second storages 9 may include complex metal hydrides including amides such as $LiNH_2$, $Mg(NH_2)_2$ and or alanates such as $NaAlH_4$, $LiAlH_4$ or include metal hydrides such as $MgH_2$.

In addition, a mixing ratio of the first storages 7 and the second storages 9 is set such that the first storages 7 account for 10% or more and less than 90% of the whole, such that the second storages 9 may discharge hydrogen by heating of the first storages 7.

That is, the ratio may be expressed as first storages:second storages=x:y, (10≤x≤90, x+y=100).

For reference, the storages may of course be implemented in various shapes such as powder or pellets.

Because all the storages 1 accommodated in the storage space are entirely heated at the same time, it is not necessary to provide a heat transfer structure such as a fin or a mesh made of a separate heat transfer material for improving heat transfer efficiency in the related art, and the amount of discharged hydrogen is increased in comparison with energy inputted to discharge the hydrogen, thereby greatly improving hydrogen discharge efficiency.

Since only the heating reaction is induced by the magnetic field applied to the storages 1, the solid hydrogen storage system according to the present disclosure may further include a cooling tube 11 in which a refrigerant flows to cool the storages 1 accommodated in the storage container 3.

That is, in the embodiment illustrated in FIG. 1, the storage container 3 includes an inner casing 13 configured to accommodate the storages 1, and an outer casing 15 configured to surround the inner casing 13. The coil 5 is spirally disposed between the inner casing 13 and the outer casing 15 and surrounds the inner casing 13. The cooling tube 11 in which the refrigerant flows is installed between the inner casing 13 and the outer casing 15 in order to cool the storages 1 accommodated in the inner casing 13.

The solid hydrogen storage system according to the present disclosure may further include a pump configured to pump the refrigerant so that the refrigerant flows along the cooling tube 11, and various types of devices such as a valve connected to the cooling tube 11. The solid hydrogen storage system may further include a power supply device for supplying electric power to the coil 5.

FIG. 2 illustrates another embodiment of the solid hydrogen storage system according to the present disclosure, in which the cooling tube 11 in which the refrigerant flows is installed to pass through the inside of the inner casing 13 to cool the storages 1 accommodated in the inner casing 13.

That is, the system according to another embodiment is identical to the system illustrated in FIG. 1, but different from the system illustrated in FIG. 1 in terms of the installation structure of the cooling tube 11.

The system may include both the installation structure of the cooling tube 11 illustrated in FIG. 1 and the installation structure of the cooling tube 11 illustrated in FIG. 2. Further, it is possible to implement a configuration in which the refrigerant flows along the entire periphery of the inner casing 13.

According to the solid hydrogen storage system according to the present disclosure as described above, the storages 1 accommodated in the storage container 3 may be heated in a contactless manner by applying the magnetic field to the storages 1. As a result, a degree of design freedom in relation to the shape and the magnitude of the system is high, the capacity of the system is large, and the system may be applied to various application fields.

While the specific exemplary embodiments of the present disclosure have been illustrated and described, it will be obvious to those skilled in the art that the present disclosure may be variously modified and changed without departing from the technical spirit of the present disclosure defined in the appended claims.

What is claimed is:

1. A storage system for storing solid hydrogen comprising:
    a plurality of storages comprising two or more types of solid hydrogen storage materials having different magnetic intensities;
    a storage container configured to accommodate the plurality of storages; and
    a coil disposed in the storage container and configured to apply a variable magnetic field to the storages accommodated in the storage container.

2. The storage system of claim 1, wherein the plurality of storages comprise:
    first storages having first one or more types of solid hydrogen storage materials, among the two or more types of solid hydrogen storage materials, comprising ferromagnetic elements; and
    second storages having second one or more types of solid hydrogen storage materials, among the two or more types of solid hydrogen storage materials, comprising non-ferromagnetic.

3. The storage system of claim 2, wherein the first one or more types of solid hydrogen storage materials have a hydrogen storage capacity smaller and a hydrogen discharge temperature lower than those of the second one or more solid hydrogen storage materials, respectively.

4. The storage system of claim 2, wherein the ferromagnetic element included in the first storages includes at least one of Fe, Ni, or Co.

5. The storage system of claim 2, wherein the first storages comprise AB, AB2, and AB5-type hydrogen storage alloy.

6. The storage system of claim 2, wherein the second one or more solid hydrogen storage materials have a hydrogen discharge temperature higher than that of the first one or more solid hydrogen storage materials.

7. The storage system of claim 2, wherein the second one or more solid hydrogen storage materials include one or more of metal hydrides and complex metal hydrides including alanates and amides.

8. The storage system of claim 2, wherein a mixing ratio of the first storages and the second storages is set such that 10% or more and less than 90% of the plurality of storages is the first storages.

9. The storage system of claim 1, further comprising a cooling tube through which a refrigerant flows to cool the plurality of storages accommodated in the storage container.

10. The storage system of claim 1, wherein the storage container comprises:
an inner casing configured to accommodate the storages; and
an outer casing configured to surround the inner casing, and
wherein the coil is disposed between the inner casing and the outer casing.

11. The storage system of claim 10, wherein a cooling tube through which a refrigerant flows is disposed between the inner casing and the outer casing to cool the storages.

12. The storage system of claim 10, wherein a cooling tube through which a refrigerant flows extends through an inside of the inner casing to cool the storages.

13. The storage system of claim 7, wherein the one or more of metal hydrides include $MgH_2$,
wherein the alanate-based materials include $NaAlH_4$, and
wherein the amide-based materials include $LiNH_2$ and $Mg(NH_2)_{-2}$.

14. The storage system of claim 12, wherein the cooling tube extends through the inside of the inner casing and extends out from the inside of the inner casing in a U-shape.

15. The storage system of claim 14, wherein an upper portion of the storage container extends out upwardly such that the cooling tube extends out from the inside of the inner casing upwardly in parallel with the upper portion of the storage container.

* * * * *